United States Patent [19]

Tsuiki

[11] Patent Number: 5,201,026
[45] Date of Patent: Apr. 6, 1993

[54] METHOD OF ARCHITECTING MULTIPLE NEURAL NETWORK AND SYSTEM THEREFOR

[75] Inventor: Makoto Tsuiki, Tokyo, Japan

[73] Assignee: Kabushiki Kaisha Toshiba, Kawasaki, Japan

[21] Appl. No.: 716,253

[22] Filed: Jun. 17, 1991

[30] Foreign Application Priority Data

Jun. 26, 1990 [JP] Japan ................... 2-167917

[51] Int. Cl.$^5$ .......................................... G06F 15/18
[52] U.S. Cl. ...................................... 395/11; 395/24
[58] Field of Search ................ 395/22, 3, 11, 23, 24

[56] References Cited

U.S. PATENT DOCUMENTS 5,046,019  9/1991  Basehore ................................. 395/3

OTHER PUBLICATIONS

Anderson, "Data Representation in Neural Networks," AI Expert, Jun. 1990, pp. 30-37.
Josin, "Combinations of Neural Systems for Particular Situations," IEEE 1st International Conference on Neural Networks, Jun. 1987, pp. IV 517-524.
Stephen I. Gallant, "Connectionist Expert Systems", *Communications of the ACM*, Feb. 1988, vol. 31, No. 2, pp. 152-169.

Primary Examiner—Michael R. Fleming
Assistant Examiner—Jodi E. Tryon
Attorney, Agent, or Firm—Foley & Lardner

[57] ABSTRACT

To facilitate architecting of a multiple neural network, irrespective of the quantity of cases and the complexity of case dependence relationship, sets of input instances and the desirable outputs corresponding thereto are stored; the stored sets are read in sequence to discriminate whether all variables included in the input instances of the read set are included in the outputs of any given stored set, to mark variables not included in the outputs of any sets; the sets whose input instances include only the marked variables are selected from among the read sets; unit neural networks for learning the selected sets are formed and simultaneously variables included in the outputs of the formed unit neural networks are marked; a unit neural network for learning any given set is formed; and the formed unit neural networks are connected to each other to architect a multiple neural network.

8 Claims, 3 Drawing Sheets

F I G. I

STRUCTURE OF STRATIFIED UNIT NEURAL NETWORK

METHOD OF ARCHITECTING MULTIPLE NEURAL NETWORK AND SYSTEM THEREFOR

BACKGROUND OF THE INVENTION

The present invention relates to a method of architecting a multiple artificial neural network and an architecting system therefor, which is suitable as expert system architecting means, in particular.

A multiple neural network for realizing an expert system will be explained hereinbelow by way of example. A method of architecting an expert system most widely adopted at present is to utilize inference based upon rules between literals represented by a line of characters, respectively (Expert System Architecting Method by Tanaka et al., Published by Personal Media Co., Ltd., 1987). In this method, a great amount of expert knowledge is gathered as rules in the form of if (premise) and then (conclusion) so as to construct a rule base. Here, the premise and the conclusion are logical expressions of literals represented by a character line, respectively. In the forward inference by this system, several facts are first inputted as logical expressions of literals represented by a character line, respectively and these logical expressions are compared with if (premise)-portion. Here, the conclusion of a rule whose if-portion matches one of the facts can be determined as a newly known fact. The above procedure is repeated until several conclusions useful for the user are known as facts or until rules to be used are all used up.

The above-mentioned method involves the following two drawbacks: First, it is extremely difficult to transform expert knowledge into the form of "if" (premise) and "then" (conclusion) and further to gather the necessary and sufficient amount of such knowledge. Secondly, since the comparison between the fact and the rule premise is executed in dependence upon a strict pattern matching of character lines, in case even a single bit of the character line to be compared is erroneous, the matching will fail. Further, since vague facts are utilized, rather complicated procedures such as calculations of certainty factors, application of fuzzy concept, etc. are inevitably required.

With these facts in mind, recently it has been proposed to utilize an artificial neural network to architect an expert system, as presented in (S. I. Gallant: Connectionist Expert System, Communications of the ACM, vol. 31, No. 2, pp. 152-169, February 1988). In this proposal, a unit neural network is a network formed by mutually connecting an input section composed of a plurality of input neuron (neurons cells are referred to as cells, hereinafter), an output section composed of a plurality of output cells, and a hidden section composed of a plurality of cells, by signal lines referred to as axone (Aso: Neural Network Information Processing, Published by Sangyo Tosho, 1988). In dependence upon the unit neural network as described above, it is possible to realize an example of inference systems as follows:

Let A and B denote any given literal list, respectively:

$$A = (A1, A2 \dots An), B = (B1, B2 \dots Bm).$$

where $Ai$ ($i=1, 2, \dots n$) and $Bj$ ($j=1, 2, \dots m$) represent literals. Let us assume that A and B have no common element. That is, a literal as a B's element will not be an A's element. A literal has any one of logical value 1 (true), $-1$ (false) or 0 (ambiguous). The list of the values of A1, A2, ... An are referred to as an A's concrete instance, and the list of the values of B1, B2, ... Bm are referred to as a B's concrete instance. The concrete instance can be allowed to correspond to a conjunction related to the true and false of the literal. For example, one of the A's concrete instances (1 $-1$ 0 ... 1) represents (A1 is true) $\wedge$ (A2 is false) $\wedge$ (A3 is ambiguous) $\wedge$ ...

$\wedge$ (An is true)

where denotes a logical product. A set a→b of A's concrete instances a and B's concrete instances b corresponding thereto is referred to as a case, which represents a fact that if a, then b. When a plurality of these cases as described above are inputtable, it is possible to realize a logical system by allowing a unit neural network provided with n-pieces of input cells and m-pieces of output cells to learn A's concrete instances as input signal instances and the corresponding B's concrete instances as desirable output signals (referred to as teacher signals). Namely, here, the logical values of literals are variables, and the sets thereof are input and output signals to and from a unit neural network. The unit neural network serving as an inference system can execute the forward inference as follows: When any given A's concrete instance a is inputted to the input section, if a B's concrete instance b has been learned as the corresponding teacher signal, b is outputted to the output section. As described above, if a is given, b is concluded. On the other hand, if the B's concrete instance is not yet learned as the teacher signal corresponding to a, an appropriate B's concrete instance b' is constructed on the basis of the learned cases and then outputted to the output section. As described above, it is possible to obtain an appropriate conclusion b' corresponding to a for the case not directly learned. Further, if the A's concrete instance is ambiguous; that is, if the logical values of A's elements are analog values such as 0.5, for instance (not any one of 1, 0, $-1$), appropriate analog values of B's element literals are calculated on the basis of the learned cases to construct a concrete instance b' and outputted to the output section. Here, if the literal value is V and the possibility P that the literal is true is defined as $$P = 0.5 * (V+1) * 100 <\%>$$

the possibility P is 75% at V=0.5.

While in the conventional method, where an inference system is formed by using the above-mentioned cases and by setting the rules expressed by character lines as basis, all the available cases can be expressed as rules of the following form:

if (a literal conjunction corresponding to A's concrete instances)

then (a literal conjunction corresponding to the B's concrete instances)

These rules are gathered to prepare the rule base and the afore-mentioned inference is to be made by use of the rule base.

In the above-mentioned conventional method, however, since concrete instances not included in the premise of the rule base cannot be matched in pattern, it is impossible to obtain a conclusion for A's concrete instances not included in the available cases, which is different from the case where a neural network is used. To overcome the above-mentioned problem, more complicated work is required such that all the necessary cases must be incorporated in the rule base or else more general rule must be discovered to reduce the number of rules. In the conventional method, further, when the A's concrete instances are ambiguous, this inference system based upon the rules expressed by character lines cannot infer, being different from the case where a neural network is adopted. To overcome these problems, complicated procedures such as calculations of the certainty factor or application of the fuzzy concept are required, as already explained.

As described above, although it is greatly advantageous to adopt a neural network as an inference system, when the inference system based upon the above-mentioned neural network is utilized in the ordinary industrial field, the unit neural network is insufficient in capacity, so that it is indispensable to use a multiple neural network as explained hereinbelow.

When an inference system is to be architected, first the available ones are generally in the form of:

If $(A1=s1) \wedge (A2=s2) \wedge ... \wedge (An=sn)$, then $\wedge (Am=sm)$ where $A=s$ denotes that the logical value of a literal A is s. In the sets of these cases as described above, it is unavoidable that literals existing on the right side of the cases (on the right side of "then") exist on the left side of the other cases (on the left side of then ). In this case, it is necessary to architect a dual neural network in which a unit neural network including the logical values of the literals as output signals and another unit neural network including the same as input signals are connected by a necessary axone. Further, when the above-mentioned dependence relationship between the literals extends over many stages, a multiple neural network must be architected.

With reference to FIG. 6, an example of how to architect a simple multiple neural network will be explained. Here, A1 = The young is raised by milk
A2 = It is a mammal
A3 = It eats meat
A4 = It is a carnivore
A5 = Its skin is material for a samisen (Japanese musical instrument)
A6 = It is a cat
Case 1: if $(A1=1)$, then $(A2=1)$,
Case 2: if $(A2=1) \wedge (A3=1)$, then $(A4=1)$,
Case 3: if $(A4=1) \wedge (A5=1)$, then $(A6=1)$ In the above example, a literal A2: It is a mammal exists on the right side of case 1 and on the left side of the case 2, and further a literal A4: It is a carnivore exists on the right side of case 2 and on the left side of case 3. In this case, there are required a unit neural network 1 for learning the case 1 by inputting the logical value of A1 as an input signal and outputting the logical value of A2 as an output signal, a unit neural network 2 for learning the case 2 by inputting the logical values of A2 and A3 as input signals and outputting the logical value of A4 as an output signal, and a unit neural network 3 for learning the case 3 by inputting the logical values of A4 and A5 as input signals and outputting the logical value of A6 as an output signal. Here, an output cell for outputting the logical value of A2 of the unit neural network 1 is used in common as an input cell for inputting the logical value of A2 of the unit neural network 2; and an output cell for outputting the logical value of A4 of the unit neural network 2 is used in common as an input cell for inputting the logical value of A4 of the unit neural network 3. As described above, the entire system is a multiple neural network composed of three unit neural networks.

The above-mentioned multiple neural network has been so far architected intuitively in dependence upon human work. However, the network architecting work becomes complicated more and more with increasing numbers of cases, literals included in each case, and increasing complication of dependence relationship between the cases and the literals. Therefore, many hours are required for experts when the structure of the multiple neural network is modified markedly to add some cases to a system already in operation. Further, in case the amount of cases and the complexity exceed a limit, respectively, it may be impossible to architect the multiple neural network in dependence upon the prior-art method as described above.

With these problems in mind, therefore, the object of the present invention is to provide a method of architecting a multiple neural network and a system therefore easy to construct, irrespective of the quantity of cases and the complexity of case dependence relationship.

SUMMARY OF THE INVENTION

To achieve the above-mentioned object, the present invention provides a method of architecting a multiple neural network, comprising the steps of: storing sets of input instances and desirable outputs corresponding thereto; reading in sequence the stored sets, discriminating whether all variables included in the input instances of the read set are included in the outputs of any given stored set; and marking variables not included in the outputs of any sets; reading in sequence the stored sets, and selecting sets whose input instances include only the marked variables from among the read sets; forming unit neural networks for learning the selected sets, and simultaneously marking variables included in the outputs of the formed unit neural networks; discriminating whether a unit neural network for learning any given set is formed; and connecting the formed unit neural networks to each other.

Further, the present invention provides a system for architecting a multiple neural network, comprising: storing means for storing sets of input instances and desirable outputs corresponding thereto; first marking means for marking variables not included in the outputs of any sets stored in said storing means; second marking means for forming unit neural networks for learning sets whose input instances include only the marked variables from among the sets stored in said storing means and simultaneously marking the variables included in the outputs of the formed unit neural networks; discriminating means for discriminating whether a unit neural network for learning any given set stored in said storing means is formed; and connecting means for connecting the formed unit neural networks each other.

DESCRIPTION OF THE PREFERRED EMBODIMENTS

Figure 1:
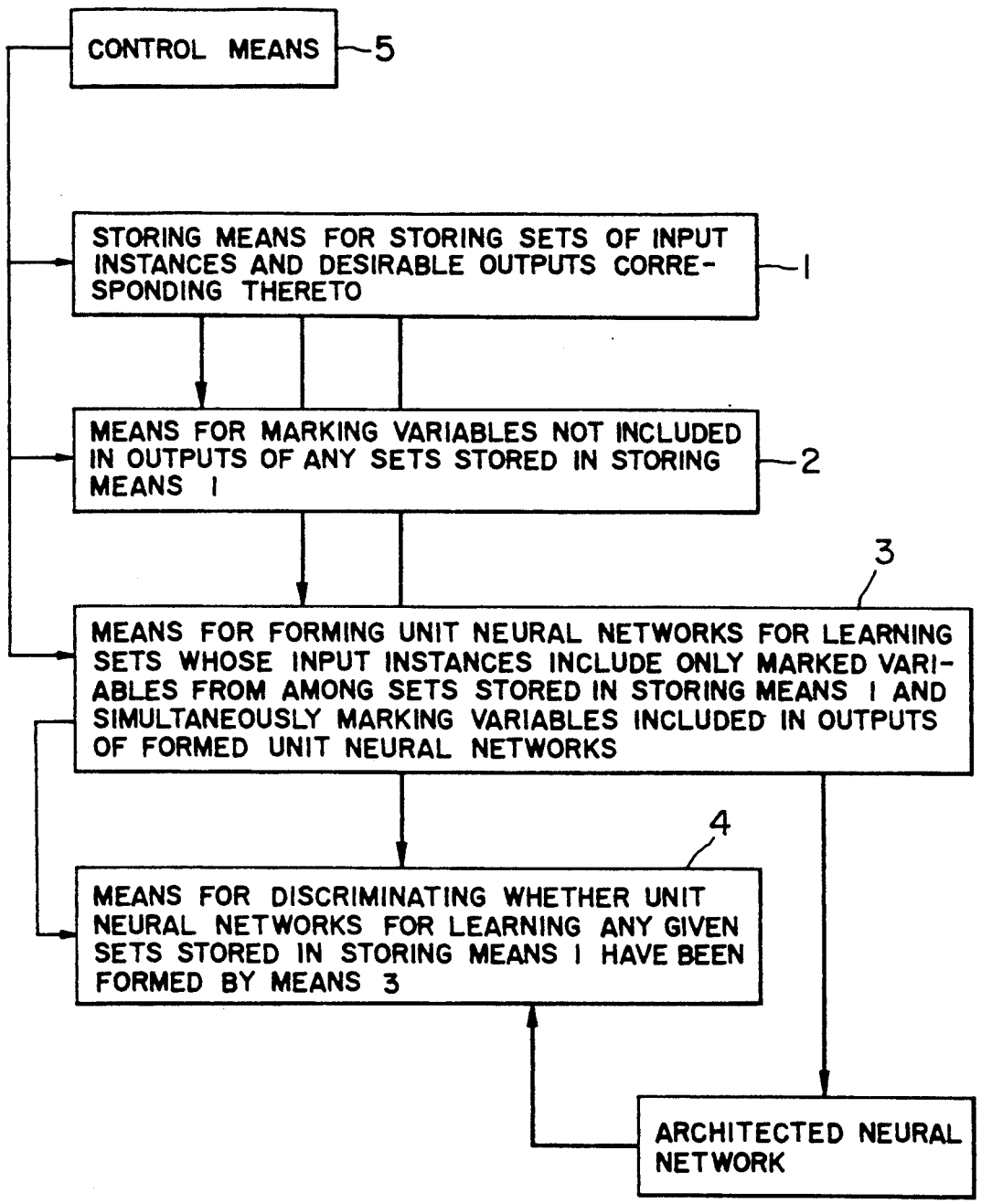
FIG. 1 is a block diagram showing the system of the present invention.

In the present invention, the storing means for storing sets of input instances and desirable outputs corresponding thereto executes nothing when a set equivalent to the given set has already been stored. If not yet stored, the storing means stores the given set. The first marking means for marking variables not included in the outputs of any sets stored in the storing means reads in sequence the sets stored in the storing means and checks whether all variables included in the input instances of the sets are included in the outputs of the any given sets stored in said storing means, to mark variables not included in the outputs of any sets. The second marking means for marking the variables included in the outputs of the unit neural network reads in sequence the sets stored in the storing means. If all the variables included in the inputs of a read set are marked, the discriminating means discriminates whether a unit neural network for learning this set has already been formed by the second marking means. As a result, if not yet formed, a unit neural network for learning the set of input instances and desirable outputs corresponding thereto is formed, and simultaneously the variables included in the outputs of the set are marked. The discriminating means, for discriminating whether the unit neural network for learning any given set stored in the storing means is formed by the second marking means, is called by the second marking means to discriminate whether the unit neural network for learning the given set has already been formed by the second marking means. The control means calls the respective means where necessary and executes the necessary operation to architect a multiple neural network. Therefore, whenever the user prepares sets of inputs and outputs corresponding thereto, it is possible to automatically architect a multiple neural network.

An embodiment of the present invention will be described hereinbelow with reference to the attached drawings. In this specification, a symbol ':=' denotes that the right side value is substituted into the left side variable; a symbol '==' denotes that the right side value is equal to the left side value; and a symbol '!=' denotes that the right side value is not equal to the left side value. Further, a symbol '=' indicates that left side variables choose all the values divided by ',' on the right side so as to change in sequence.

First, the concept of "marker" and "signal" will be explained hereinbelow. A marker is represented by a structure having the following two members:

{name, mark} where name: A designation of a variable represented by a character line. That is, if equal, this indicates the same two variables; if not equal, this indicates the two different variables.

mark: An integer. mark==0 indicates that the variable is not marked, and mark==1 indicates that the variable is marked.

The signal is a pair of a variable specified by a name and a value corresponding thereto, and is represented by a structure having the following two members:

{name, value} where name: A designation of variable similarly.

value: A real number in general. A value of a variable as a signal.

In a neural network, the input and output are groups of signals in general, respectively. The input signals (i.e. signals included in the input) and output signals (i.e. signals included in the output) are represented by the above-mentioned structure, respectively. ⌈Teacher signal⌋ indicates a kind of output signal included in the desirable output and also represented by the same structure.

A practical example of the respective means constituting the composing elements of the present invention will be described hereinbelow.

FIG. 1 is a block diagram showing a multiple neural network architecting system according to the present invention.

It is preferable that input signals included in input instances can be referred to in accordance with the following arrangement. That is, if K denotes a total number of ⌈sets of input instances and the desirable outputs corresponding thereto⌋ and I(k) denotes a total number of input signals of a set k, the storage locations are arranged as:

input(i,k), i=1, 2, 3, ..., I(k);

k=1, 2, 3, ... K.

A single input signal having the structure as described above is stored in each element of the above arrangement. Here, k denotes a number assigned to ⌈a set of input instances and the desirable outputs corresponding thereto⌋ and i denotes a number assigned to the i-th input signal included in the input. The member of the stored input signal can be referred to by symbols of ⌈Arrangement element name⌋, ⌈.⌋ and ⌈member name⌋. In more detail, for instance, name, value of the i-th input signal included in the input of the k-th ⌈set of input instances and the desirable outputs corresponding thereto⌋ can be referred to, respectively by input(i,k). name and input(i,k). value.

Similarly, output(j,k), j=1, 2, 3, ..., J(k);

k=1, 2, 3, ..., K.

is prepared, and name, value of the j-th output signal (i.e., the teacher signal) included in the output of the k-th ⌈set of input instances and the desirable outputs corresponding thereto⌋ can be referred to by output(j,k). name and output(j,k). value, where J(k) denotes the number of the output signals included in the outputs of the k-th set.

An embodiment of Γ storing means 1 for storing sets of input instances and the desirable outputs corresponding thereto J according to the present invention can be realized by a storage location arrangement where Γ sets of input instances and the desirable outputs corresponding thereto J given by some input means or data transmitting means are stored in accordance with the above-mentioned input and output forms. Under these conditions, it is possible to refer to the input signals and the teacher signals of all the sets in the above-mentioned method.

Although not essential requirements in the present invention, it is preferable that all the markers can be referred to in the form of a list or arrangement. In more detail, a storage location arrangement variable(n), n=1, 2, 3, ..., N.

is prepared, where N denotes the total number of variables; and an n-th marker of the structure as described above is stored in the n-th element of the arrangement. In the same way as with the case of a signal, the n-th marker member (name, mark) can be referred to, respectively by variable(n).name, variable(n).mark The variable can be formed by input, output stored in the storing means 1 in accordance with the following procedure:

Procedure (A)

| | |
|---|---|
| A1. | N:=1. |
| A2. | variable(N).name:=input(1,1).name |
| A3. | variable(N).mark:=0. |
| A4. | k:=1. |
| A5. | i:=1. |
| A6. | n:=1. |
| A7. | If variable(n).name==input(i,k).name, then go to A12. |
| A8. | If n<N, then n:=n+1 and go to A7. |
| A9. | N:=N+1. |
| A10. | variable(N).name:=input(i,k).name. |
| A11. | variable(N).mark:=0. |
| A12. | If i<I(k), then i:=i+1 and go to A6. |
| A13. | j:=1. |
| A14. | n:=1. |
| A15. | If variable(n).name==output(j,k).name, then go to A20. |
| A16. | If n<N, then n:=n+1 and go to A15. |
| A17. | N:=N+1. |
| A18. | variable(N).name:=output(j,k).name. |
| A19. | variable(N).mark:=0. |
| A20. | If j<J(k), then j:=j+1 and go to A14. |
| A21. | If k<K, then k:=k+1 and go to A5. |
| A22. | End. |

When the arrangement of a variable is determined as described above, the number N of all the variables can be obtained simultaneously. Further, since variable(n).mark==0 in all the variables(n), all the variables are initialized into the non-marked state.

The means 2 for marking variables not included in the outputs of any sets stored in the storing means 1 can be realized by changing variable(n).mark in accordance with the following procedure:

Procedure (B)

| | |
|---|---|
| B1. | n:=1. |
| B2. | k:=1. |
| B3 | j:=1. |
| B4. | If variable(n).name==output(j,k).name, then go to B8. |
| B5. | If j<J(k), then j:=j+1 and go to B4. |
| B6. | If k<K, then k:=k+1 and go to B3. |
| B7. | variable(n).mark:=1. |
| B8. | If n<N, then n:=n+1 and go to B2. |
| B9. | End. |

In this procedure, variable(n).mark==1 is set for variables not included in the outputs of any sets stored in the storing means 1, but variable(n).mark==0 is set for the variables other than the above.

The means 3 for forming a unit neural network for learning sets whose input instances include only marked variables from among sets stored by the storing means 1 and simultaneously marking variables included in the outputs of the formed unit neural network can be realized by the following procedure (C). In this procedure, there is prepared an arrangement having K-pieces of elements as nnet(k), k=1, 2, 3, ..., K and nnet(k)==m represents that the m-th unit neural network for learning the k-th Γset of input instances and the desirable outputs corresponding thereto J is formed. nnet(k)==0 means that the unit neural network for learning the k-th Γset of input instances and the desirable outputs corresponding thereto J is not yet formed, and they are initialized by nnet(k):=0. Further, the total number of unit neural networks formed in accordance with the following procedure (C) is denoted as M, and there are prepared the following arrangements:

sense_name(p,m), p=1, 2, 3, ..., P(m);

m=1, 2, 3, ..., M resp_name(q,m), q=1, 2, 3, ..., Q(m);

m=1, 2, 3, ..., M to store the name or the variable designation of the p-th input signal of the m-th unit neural network in sense_name(p,m). Here, sense-name(p,m) represents a name of the p-th input signal of the m-th unit neural network. Further, a name or a variable designation of the q-th output signal of the m-th unit neural network is stored in resp_name(q,m).

Procedure (C)

| | |
|---|---|
| C1. | M:=0. |
| C2. | k:=1. |
| C3. | If nnet(k)!=0, then go to C24. |
| C4. | i:=1. |
| C5. | n:=1. |
| C6. | If variable(n).name==input(i,k).name and variable(n).mark==0, then go to C24. |
| C7. | If variable(n).name==input(i,k).name and variable(n).mark==1, then go to C9. |
| C8. | If n<N, then n:=n+1 and go to C6. |
| C9. | If i<I(k), then i:=i+1 and go to C5. |
| C10. | The means 4 for discriminating whether the unit neural network for learning any given single set stored by the storing means 1 has been formed by the means 3 discriminates whether the unit neural |

Procedure (C) -continued network for learning k-th set of input instances
and the desirable outputs corresponding thereto
has already been formed in accordance with the
present procedure (C). As a result, when the unit
neural network has already been formed as the m-th
network,
    nnet(k):=m and procedure goes to C24.
C11.  M:=M+1 is set and a unit neural network for learning
    the k-th set of input instances and the desirable
    outputs corresponding thereto is formed, and then
    nnet(k):=M is set.
C12.  P(M):=I(k), Q(M):=J(k).
C13.  p:=1.
C14.    sense_name(p,M):=input(p,k).name.
C15.  If P<p(M), then p:=p+1 and go to C14.
C16.  q:=1.
C17.    resp_name(q,M):=output(q,k).name.
C18.  If q<Q(M), then q:=q+1 and go to C17.
C19.  j:=1.
C20.    n:=1.
C21.      If variable(n).name==output(j,k).name, then
        variable(n).mark:=1 and go to C23.
C22.    If n<N, then n:=n+1 and go to C21.
C23.    If j<J(k), then j:=j+1 and go to C20.
C24.  If k<K, then k:=k+1 and go to C3.
C25.  End.

By the above-mentioned procedure, M-pieces of unit neural networks can be formed. Here, the means 4 for discriminating whether the unit neural networks for learning any given set stored by the storing means 1 has been formed by the means 3 may be realized by the following procedure (D): This is because no overlapped input signals and overlapped output signals exist in the unit neural networks. That is, there exists neither $$\text{sense\_name}(p,m) == \text{sense\_name}(p', m)$$

and $p! = p'$ nor $$\text{resp\_name}(q,m) == \text{resp\_name}(q', m) \text{ and}$$

$q! = q'$

Procedure (D)

Figure 2:
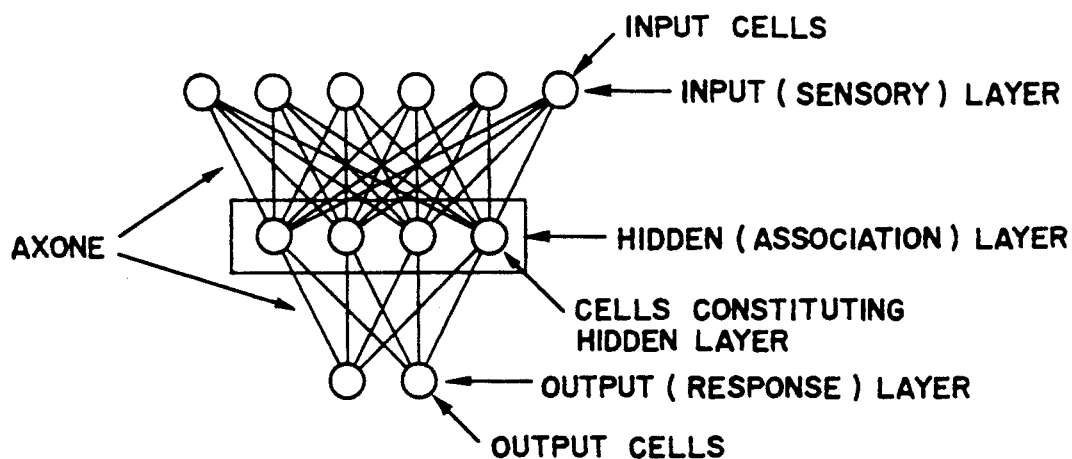
FIG. 2 is a diagram showing the structure of a stratified unit neural network.

D1.  m:=1, flag:=0, if M==0, then go to D17.
D2.  If P(m)!=I(k) or Q(m)!=J(k), then go to D16.
D3.  i:=1.
D4.    p:=1.
D5.      If input(i,k).name==sense_name(p,m), then
        go to D8.
D6.      If P<p(m), then p:=p+1 and go to D5.
D7.      Go to D16.
D8.    If i<I(k), then i:=i+1 and go to D4.
D9.  j:=1.
D10.    q:=1.
D11.      If output(j,k).name==resp_name(q,m), then
        go to D14.
D12.    If q<Q(m), then q:=q+1 and go to D11.
D13.    Go to D16.
D14.  If j<J(k), then j:=j+1 and go to D10.
D15.  flag:=1 and go to D17.
D16.  If m<M, then m:=m+1 and go to D2.
D17.  End The above procedure (D) discriminates whether the unit neural network for learning the k-th set stored by the storing means 1 has been formed or not. If already formed, flag==1 is set and a number m is given to the formed unit neural network. In contrast, if not yet formed, flag==0 is set. Here, M denotes the total number of unit neural networks formed in accordance with the procedure (C), before the present procedure (D) is executed.

Where a Perceptron type neural network (presented by Aso, as already cited) is adopted in C11 of the Procedure (C) as the unit neural network for learning the k-th set of input instances and the desirable outputs corresponding thereto , a neural network as shown in FIG. 2 is formed. In FIG. 2, a sensory layer of the unit neural network is an input section, and the number of the neurons or the input cells is equal to P(M). Further, a response layer thereof is an output section, and the number of neurons or the output cells is equal to Q(M). An association layer thereof is a hidden section, and the number of the cells is determined when this unit neural network is learning, as described hereinbelow.

In general, the learning of the M-th unit neural network can be executed, after the procedure (C) ends, in accordance with error backward propagation method (presented by Aso, as already cited) such that the all sets of input instances and the desirable outputs corresponding thereto are utilized as nnet(k)==M. In accordance with this method, it is possible to determine the connection weight between the sensory layer neurons and the association layer neurons and that between the association layer neurons and the response layer neurons in such a way that the square sum of error of the output signals with respect to the teacher signals of the unit neural network can be minimized. In this method, in order that the error of the output signals with respect to the teacher signals of the unit neural network is determined below a required value, the number of neurons in the association layer is increased at need by the rule of trial and error.

In the step C11 of the procedure (C), when an RCE network (Nestor Inc. Learning System neural network formed by combining a plurality of neural network models, Published by Nikkei BP Co., Ltd., 1988) is adopted as the unit neural network for learning the k-th ⌈set of input instances and the desirable outputs corresponding thereto⌋, a neural network similar in structure to the perceptron type neural network as shown in FIG. 2 is formed, in which the number of the input cells is equal to P(M) and the number of output cells is equal to Q(M). The number of cells in the intermediate layer is less than the number of ⌈sets of input instances and the desirable outputs corresponding thereto ⌋ such as nnet(k)==M, being different from the case of the perceptron type neural network. Further, being different from the perceptron type neural network, the connection weight is determined in such a way that the connection weight between the intermediate layer cells corresponding to the k-th⌈set of input instances and the desirable outputs corresponding thereto ⌋and the neurons for inputting the i-th input signals is determined to be equal to input(i,k).value and that between the intermediate layer cells corresponding to the k-th set and the neurons for outputting the j-th output signals is determined to be equal to output(j,k).value.

In the steps C19 to C23 of Procedure (C), the variables included in the outputs of the unit neural network formed by the step C11 are marked. Therefore, the number of the marked variables increases in general at the end of Procedure (C), as compared with that obtained at the start of Procedure (C).

The method of architecting a multiple neural network by operating the respective means as described above under control of control means 5 will be explained hereinbelow.

| Procedure (D) | |
|---|---|
| E1. | K-pieces of Γ sets of input instances and the desirable outputs corresponding thereto J given via some input means or data transmitting means are stored in the storing means 1 for storing Γ sets of input instances and the desirable outputs corresponding thereto J. For example, the K-pieces of sets are stored at storage location arrangement in the form of "input" and "output" as already explained. |
| E2. | The array "variable" is determined in accordance with Procedure (A). |
| E3. | Means 2 (e.g. Procedure (B)) for marking variables not included in outputs of any sets stored by the storing means 1 is called and executed |
| E4. | L:=K, nnet(k):=0, where k = 1, 2, 3, ..., K. |
| E5. | A unit neural network for learning a set whose input instances includes only the marked variables from among sets stored in the storing means is formed by the means 3 (e.g. Procedure (C)). And the variables included in the outputs of the formed unit neural network are marked. |
| E6. | The number of Γ sets of input instances and the desirable outputs corresponding thereto J whose nnet(k) was newly set to be nnet(k)!=0 at step E5 is subtracted from L. |
| E7. | If L > 0, go to E5. |
| E8. | End. |

The process of architecting a multiple neural network in accordance with Procedure (E) will be explained hereinbelow by taking the case of Γ sets of input instances and the desirable outputs corresponding thereto J.

EXAMPLE

Set k==1.
 Input instances: A1==1, A2==1, A3==1, A4==1.
 Desirable outputs: B1==1, B2==0.
Set k==2.
 Input instances: B1==1, B2==1, A5==1.
 Desirable outputs: C1==1, C2==0, C3==1.
Set k==3.
 Input instances: A1==1, B1==1, C1==1.
 Desirable outputs: D1==1, D2==0.
Set k==4.
 Input instances: A1==0, A2==1, A3==0, A4==1.
 Desirable outputs: B1==0, B2==1.
Set k==5.
 Input instances: B1==0, B2==1, A5==0.
 Desirable outputs: C1==0, C2==1, C3==1.
Set k==6.
 Input instances: A1==0, B1==0, C1==1.
 Desirable outputs: D1==0, D2==0.

These variables and their values are stored in sequence in accordance with the arrangement of input and output as follows:

input(1,1).name:='A1', input(1,1).value:=1
input(2,1).name:='A2', input(2,1).value:=1
input(3,1).name:='A3', input(3,1).value:=1
input(4,1).name:='A4', input(4,1).value:=1
input(1,2).value:='B1', input(1,2).name:=1
input(2,2).name:='B2', input(2,2).value:=1
input(3,2).name:='A5', input(3,2).value:=1
input(1,3).name:='A1', input(1,3).value:=1
input(2,3).name:='B1', input(2,3).value:=1
input(3,3).name:='C1', input(3,3).value:=1
input(1,4).name:='A1', input(1,4).value:=0
input(2,4).name:='A2', input(2,4).value:=1
input(3,4).name:='A3', input(3,4).value:=0
input(4,4).name:='A4', input(4,4).value:=1
input(1,5).name:='B1', input(1,5).value:=0
input(2,5).name:='B2', input(2,5).value:=1
input(3,5).name:='A5', input(3,5).value:=0
input(1,6).name:='A1', input(1,6).value:=0
input(2,6).name:='B1', input(2,6).value:=0
input(3,6).name:='C1', input(3,6).value:=1 output(1,1).name:='B1', output(1,1).value:=1
output(2,1).name:='B2', output(2,1).value:=0
output(1,2).name:='C1', output(1,2).value:=1
output(2,2).name:='C2', output(2,2).value:=0
output(3,2).name:='C3', output(3,2).value:=1
output(1,3).name:='D1', output(1,3).value:=1
output(2,3).name:='D2', output(2,3).value:=0
output(1,4).name:='B1', output(1,4).value:=0
output(2,4).name:='B2', output(2,4).value:=1
output(1,5).name:='C1', output(1,5).value:=0
output(2,5).name:='C2', output(2,5).value:=1
output(3,5).name:='C3', output(3,5).value:=1
output(1,6).name:='D1', output(1,6).value:=0
output(2,6).name:='D2', output(2,6).value:=0

Procedure (A) is applied to the above arrangement to form variables as follows:

variable(1).name:='A1', variable(1).mark:=0
variable(2).name:='A2', variable(2).mark:=0
variable(3).name:='A3', variable(3).mark:=0
variable(4).name:='A4', variable(4).mark:=0
variable(5).name:='B1', variable(5) mark:=0
variable(6).name:='B2', variable(6).mark:=0
variable(7).name:='A5', variable(7).mark:=0
variable(8).name:='C1', variable(8).mark:=0
variable(9).name:='C2', variable(9).mark:=0
variable(10).name:='C3', variable(10).mark:=0
variable(11).name:='D1', variable(11).mark:=0
variable(12). name:='D2', variable(12).mark:=0

The variable(n).mark is changed by the means 2 for marking variables not included in the outputs of any sets stored in the storing means 1 in accordance with Procedure (B) as follows:

variable(1).name:='A1', variable(1).mark:=1
variable(2).name:='A2', variable(2).mark:=1
variable(3).name:='A3', variable(3).mark:=1
variable(4).name:='A4', variable(4).mark:=1
variable(5).name:='B1', variable(5).mark:=0
variable(6).name:='B2', variable(6).mark:=0
variable(7).name:='A5', variable(7).mark:=1
variable(8).name:='C1', variable(8).mark:=0
variable(9).name:='C2', variable(9).mark:=0
variable(10).name:='C3', variable(10).mark:=0
variable(11).name:='D1', variable(11).mark:=0
variable(12).name:='D2', variable(12).mark:=0

In the initial state, L:=6, nnet(k):=0, where k=1, 2, 3, 4, 5, 6.

Figure 3:
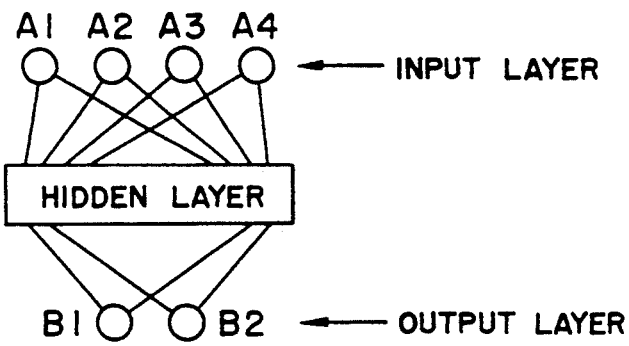
FIG. 3 is a diagram for assistance in explaining procedure (E), in which the first stage unit neural network is formed, as an example, in the process of forming a multiple neural network.

A unit neural network for learning sets whose input instances include only marked variables from among sets stored in the storing means 1 is formed by the means 3 (e.g. Procedure (C)). And the variables included in the outputs of the formed unit neural network are marked at the same time. A unit neural network for learning variables of the inputs and outputs of the set of k==1 can be formed as m==1 (See FIG. 3).

In this unit neural network, sense_name, and resp_name are determined as sense_name(1,1):='A1'
sense_name(2,1):='A2'
sense_name(3,1):='A3'
sense_name(4,1):='A4'
resp_name(1,1):='B1'
resp_name(2,1):='B2'

Further, variable(n).mark is changed as variable(1).name:='A1', variable(1).mark:=1
variable(2).name:='A2', variable(2).mark:=1
variable(3).name:='A3', variable(3).mark:=1
variable(4).name:='A4', variable(4).mark:=1
variable(5).name:='B1', variable(5).mark:=1
variable(6).name:='B2', variable(6).mark:=1
variable(7).name:='A5', variable(7).mark:=1
variable(8).name:='C1', variable(8).mark:=0
variable(9) name:='C2', variable(9).mark:=0
variable(10).name:='C3', variable(10).mark:=0
variable(11).name:='D1', variable(11).mark:=0
variable(12).name:='D2', variable(12).mark:=0

Further, nnet(1):=1, nnet(4):=1, L:=4

Figure 4:
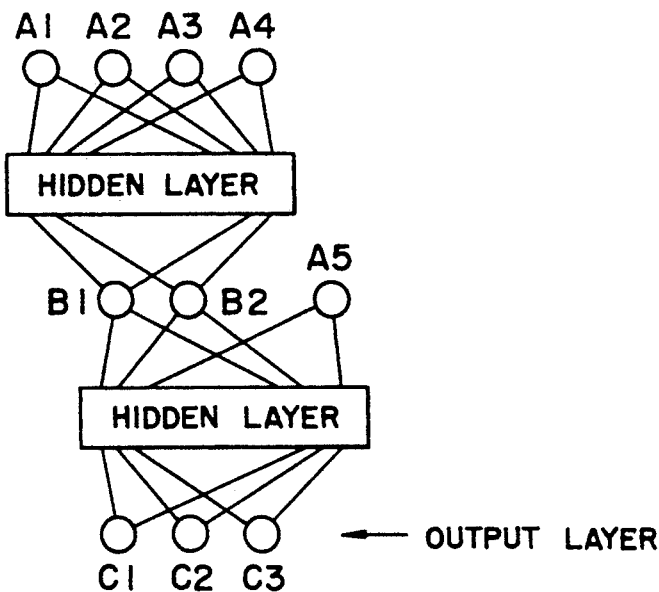
FIG. 4 is a diagram for assistance in explaining procedure (E), in which the second stage unit neural network is formed in the same forming process.

Here, since the unit neural network for learning the set of k==4 has already been formed as the network for learning the set of k==1, it should be noted that nnet(4):=1. Since L>0, procedure (C) is executed again to form a unit neural network for learning the input and output variables of the set of k==2, so that a dual neural network is formed together with that previously formed, as shown in FIG. 4. The sense_name, and resp_name of this unit neural network are determined as sense_name(1,2):='A5'
sense_name(2,2):='B1'
sense_name(3,2):='B2'
resp_name(1,2):='C1'
resp_name(2,2):='C2' resp_name(3,2):='C3'

Further, the variable(n).mark is changed as follows:
variable(1).name:='A1', variable(1).mark:=1
variable(2).name:='A2', variable(2).mark:=1
variable(3).name:='A3', variable(3).mark:=1
variable(4).name:='A4', variable(4).mark:=1
variable(5).name:='B1', variable(5).mark:=1
variable(6).name:='B2', variable(6).mark:=1
variable(7).name:='A5', variable(7).mark:=1
variable(8).name:='C1', variable(8).mark:=1
variable(9).name:='C2', variable(9).mark:=1
variable(10).name:='C3', variable(10).mark:=1
variable(11).name:='D1', variable(11).mark:=0
variable(12).name:='D2', variable(12).mark:=0

Figure 5:
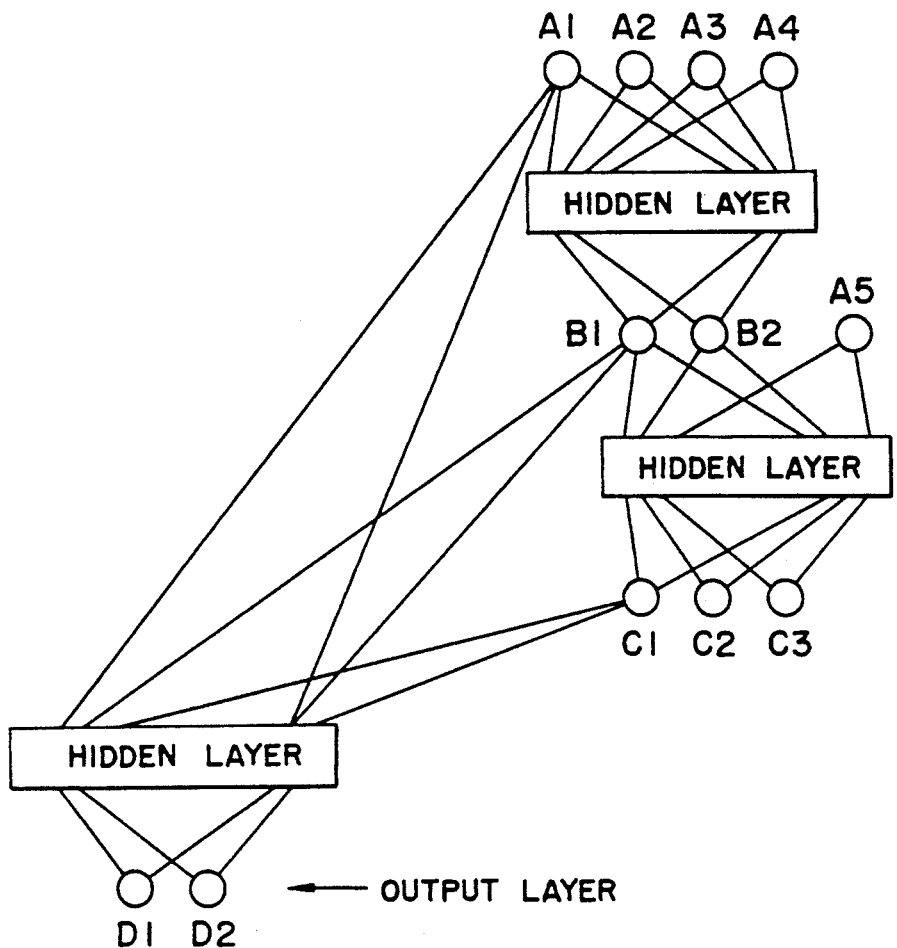
FIG. 5 is a diagram for assistance in explaining procedure (E), in which the third stage unit neural network is formed in the same forming process.
Figure 6:
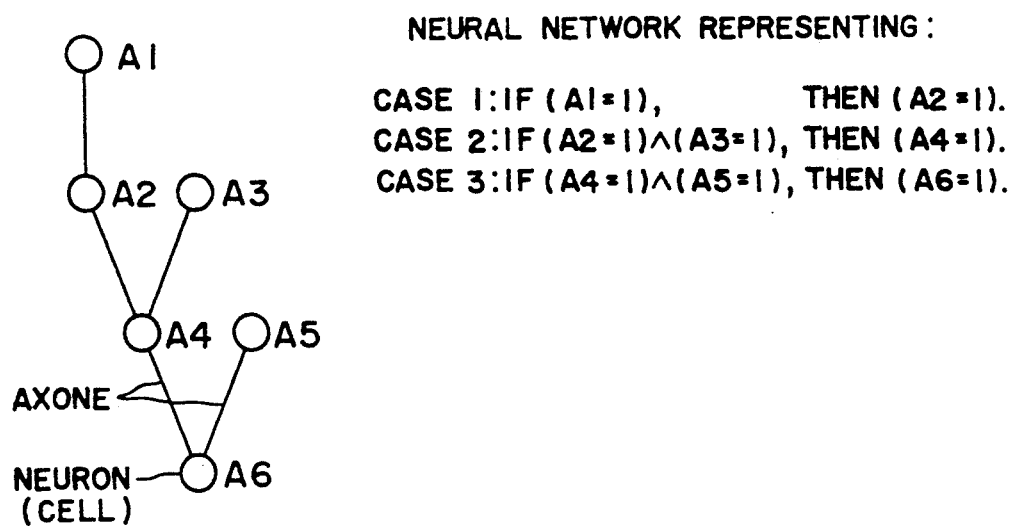
FIG. 6 is a diagram showing an example of a multiple neural network which can learn three cases 1, 2 and 3.

Further, nnet(2):=2, nnet(5):=2, L:=2. Since L>0, procedure (C) is executed again to form a unit neural network for learning the input and output variables of the set of K==3, so that a triple neural network is formed together with those previously formed, as shown in FIG. 5. The sense_name, and resp_name of this unit neural network are determined as sense_name(1,3):='A1'
sense_name(2,3):='B1'
sense_name(3,3):='C1'
resp_name(1,3):='D1'
resp_name(2,3):='D2'

Here, the variable(n).mark is all 1, and nnet(3):=3, nnet(6):=3, L:=0, thus all the procedures end to complete a multiple neural network. Here, the respective unit neural networks are determined as follows: the unit neural network m==1 learns the sets k==1, k==4 of nnet(k)==1; the unit neural network m==2 learns the sets k==2, k==5 of nnet(k)==2; and the unit neural network m==3 learns the sets k==3, k==6 of nnet(k)==3.

Here, there exists the case where it is impossible to form a unit neural network for learning the sets whose input instances include only marked variables from among the sets stored in the storing means 1. This indicates that there exist no sets in which the input instances include only marked variables, and therefore the input instances include variables which are the outputs of the other sets. In this case, a chain is externally traced in such a way that beginning from any given set 'a', a set 'b' whose outputs include variables included in the input instances of the set 'a' is obtained; a set 'c' whose outputs include variables included in the input instances of the set 'b' is obtained; ... and so on. This is because if there exists a set which can cut off the above-mentioned chain, no set whose outputs include variables included in the input instances of the set will exist, and in this case, therefore, the means 3 can form the unit neural network for learning the set. In other words, the above-mentioned chain will not be cut off externally. On the other hand, since the number of sets is finite, one set x inevitably appears at least twice anyhow in this chain, because the inputs of this set x is dependent upon the outputs of the set x itself, so that a so-called circulation will occur. Therefore, since this circulation indicates that there exists an error in a group of sets of input instances and the desirable outputs, it is possible to detect the presence of error by the method according to the present invention. In case an error is detected, an alarm is generated to stop the system.

After the multiple neural network has been architected in accordance with the above-mentioned method and further the learning of the respective unit neural networks included therein has been completed, inference can be made by the multiple neural network in accordance with procedure (F) as follows: a storage location arrangement as node(n), n=1, 2, 3, ..., N.

is prepared, where N denotes the total number of the variables. Two members of name,value are stored at the n-th element of the above arrangement, so that the name and value of the n-th variable can be referred to by node(n).name, and node(n).value. Here, node(n).value==NULL indicates that the variable value is unknown. Further, a storage location arrangement as done(m), m=1, 2, 3, ..., M.

is prepared, where M denotes the total number of the unit neural networks. An integer is stored in the m-th element of the arrangement. Here, done(m)==0 indicates that the unit neural network m does not execute inference, and done(m)==1 indicates that the unit neural network m already executed inference.

| Procedure (F) | |
|---|---|
| F1. | node(n).value:=NULL, where n = 1, 2, 3, ..., N. done(m):=0, where m = 1, 2, 3, ..., M. |
| F2. | Input all the known values v(n) of the variables and set: node(n).value:=v(n) |
| F3. | m:=1. |
| F4. | If done(m)==1, then go to F6. |
| F5. | If values of all the variables included in the inputs of the unit neural network m are known, infer by the unit neural network; set done(m):=1; obtain the value v(n) of the variables n included in the output; set node(n).value:=v(n) for these variables; and go to F3. Or else, if any one of the variables included in the inputs of the unit neural network m is unknown, go directly to F6, without execution. |
| F6. | If m<M, then m:=m+1 and go to F4. |
| F7. | End. |

As described above, it is possible to obtain the values of variables corresponding to the inputs, by inputting values of inputtable variables to the multiple neural networks. In the case of the network shown in FIG. 5, if values

A1, A2, A3, A4, A5 are available, values B1, B2 can be obtained by inputting these known values A1, A2, A3, A4 to the unit neural network 1; values C1, C2, C3 can be obtained by inputting values B1, B2, A5 to the unit neural network 2; and values D1, D2 can be obtained by inputting values A1, B1, C1 to the unit neural network 3. Further, if only values A1, B1, C1 are available, although values D1, D2 can be obtained by inputting these known values A1, B1, C1 to the unit neural network 3, no values can be obtained about the other variables.

As described above, according to the present invention, it is possible to easily architect a multiple neural network which can accurately and completely represent the relationship between variables, mechanically and automatically, irrespective of the amount of variables and the complicated dependence relationship between variables.

What is claimed is:

1. A method of architecting a multiple neural network, comprising the steps of:
    storing sets of input instances and desirable outputs corresponding thereto;
    reading in sequence the stored sets, discriminating whether all variables included in input instances of a read set are included in outputs of any given stored set, and marking variables not included in the outputs of any sets;
    reading in sequence the stored sets, and selecting sets whose input instances include only marked variables from among the read sets;
    forming unit neural networks to learn selected sets, and simultaneously marking variables included in outputs of formed unit neural networks;
    discriminating whether a unit neural network to learn any given set has been formed; and
    connecting formed unit neural networks to each other.

2. A method of forming a multiple neural network according to claim 1 wherein the step of storing sets of input instances and desirable outputs corresponding thereto comprises:
    defining a signal as a structure having a variable name and a value of a variable as members;
    providing a first arrangement of storage locations having a number of elements equal to a total number of all input signals which are included in input instances of sets of input instances and desirable outputs corresponding thereto, and either storing the input signals successively in one of the elements of the first arrangement or storing the input signals in an arbitrary storage location, and storing pointers which point to a location storing the signals successively in the first arrangement; and
    providing a second arrangement of storage locations having a number of elements equal to a total number of all output signals included in outputs of sets of input instances and desirable outputs corresponding thereto, and either storing the output signals successively in one of the elements of the second arrangement or storing the output signals in an arbitrary storage location, and storing pointers which point to a location storing the signals successively in the second arrangement, then enabling reference to each of the variable names and values of the signals which are included in the input and the output of sets of input instances and desirable outputs corresponding thereto.

3. A method of forming a multiple neural network according to claim 2 wherein the step of reading in sequence the stored sets, discriminating whether all variables included in the input instances of the read set are included in the outputs of any given stored set, and marking variables not included in the outputs of any set comprises:
    defining a marker of a variable as a structure having a variable name and a flag as members;
    expressing that the variable is marked by the flag being on and the variable is not marked by the flag being off;
    initializing marks of all variables to the on state;
    comparing each of all the variable names NAME1 with variable names of all signals which are included in outputs of all sets of input instances and desirable outputs corresponding thereto for all input signals of all sets of input instances and desirable outputs corresponding thereto; and
    setting a mark of a marker of a variable off when signals having a variable name identical with NAME1 are included in the outputs.

4. A method of forming a multiple neural network according to claim 3 wherein the step of reading in sequence the stored sets, and selecting sets whose input instances include only marked variables from among the read sets comprises:
    judging whether or not there is already a unit neural network to learn each of all sets of input instances and desirable outputs corresponding thereto, by discriminating whether a unit neural network to learn any given set has been formed;
    judging whether or not a variable is marked, when a unit neural network has not been formed, for all input signals of the set of input instances and a desirable output corresponding thereto; and
    when all variables of an input signal are marked, selecting a set of input instances and a desirable output corresponding thereto to form a unit neural network to learn the selected set.

5. A method of forming a multiple neural network according to claim 3, wherein the step of forming unit neural networks to learn selected sets, and simultaneously marking variables included in outputs of a formed unit neural network comprises:

forming a unit neural network to learn a selected set of input instances and a desirable output corresponding thereto; and marking all variables having the same name as any one of the signals included in outputs of the selected set of input instances and desirable outputs corresponding thereto.

6. A method of forming a multiple neural network according to claim 2 wherein the step of discriminating whether a unit neural network to learn any given set has been formed comprises:

comparing variable names of all signals included in input instances and outputs of a given set of input instances and desirable outputs corresponding thereto with variable names of input and output signals of a neural network which is already formed; and when there is a unit neural network having input and output signals of exactly the same variable names as variable names of input and output signals of a set of input instances and desirable outputs corresponding thereto, judging that there already exists a unit neural network to learn the set of input instances and a desirable output corresponding thereto.

7. A method of forming a multiple neural network according to claim 2 wherein the step of connecting the formed unit neural networks to each other comprises:

when an input signal to an input cell of a first unit neural network has a variable name identical to a variable name of an output signal from an output cell of a second unit neural network, connecting the output cell of the second unit neural network to the input cell of the first unit neural network with an axone.

8. A system for architecting a multiple neural network, the system comprising:

storing means for storing sets of input instances and desirable outputs corresponding thereto;

first marking means, coupled to the storing means, for marking variables not included in outputs of any sets stored in the storing means;

second marking means, coupled to the first marking means, for forming unit neural networks to learn sets whose input instances include only marked variables from among sets stored in the storing means and simultaneously marking variables included in outputs of formed unit neural networks;

discriminating means, coupled to the second marking means, for discriminating whether a unit neural network to learn any given set stored in the storing means has been formed; and connecting means, coupled to the second marking means, for connecting formed unit neural networks to each other.

* * * * *